Patented Sept. 16, 1952

2,610,956

UNITED STATES PATENT OFFICE 2,610,956

METHOD OF MIXING POLYETHYLENE WITH ASPHALT BITUMENS

Jan Cornelis Derksen and Frans Marie Jacobs, Eindhoven, Netherlands, assignors to Hartford National Bank and Trust Company, Hartford, Conn., as trustee No Drawing. Application December 8, 1948, Serial No. 64,261. In the Netherlands January 9, 1948

1 Claim. (Cl. 260—28.5)

In using asphalt bitumens for providing protection against mechanical damage, for protecting metal surfaces against corrosion, for impregnating fabric or paper, for insulation purposes and the like the disadvantage often occurs that the asphalt bitumens are brittle due to which cracks may form.

To reduce the brittleness of asphalt bitumens it has been proposed to add polyethylene. Naturally polyethylene is used of which the molecular weight is sufficient for ensuring this decrease in brittleness. Polyethylene having an average molecular weight between 17,000 and 20,000 is particularly suitable for this purpose.

Sometimes the mixing of such polyethylene with asphalt bitumens is difficult and more particularly with asphalt bitumens having a softening point exceeding 75° C., measured according to the ring and ball method and specified according to U. S. A. S. T. M. rule E 28–42 T.

As such asphalt bitumens which tend to become liquid only at very high temperatures, those may be mentioned which have been treated at a high temperature with air, which treatment is called "blowing." The expression "softening point measured according to the ring or ball method" is to be understood to mean the procedure according to the said U. S. A. S. T. M. rule E 28–42 T.

For various uses it is desirable to use such asphalt bitumens, for example for coating parts of radio sets, for example mica condensers and resistances. However, the disadvantage is experienced that these asphalt bitumens are usually too brittle for affording protection against mechanical influences. If polyethylene reducing the brittleness is to be mixed with asphalt bitumens having a softening point exceeding 75° C., measured according to the ring and ball method, the disadvantage occurs that in order to obtain a homogeneous mixture it is necessary to heat and stir for a long time. This holds particularly for the aforesaid kind of polyethylene having an average molecular weight between 17,000 and 20,000.

According to the invention which has for its object to mitigate this drawback, the polyethylene to be added is first mixed with a dispersion agent not volatile at room temperature, which agent has a dominating aliphatic hydrocarbon character and permits the polyethylene to be mixed homogeneously at least in a ratio of one part by weight of polyethylene and two parts by weight of dispersion agent. Furthermore, this dispersion agent is readily miscible homogeneously with asphalt bitumens having a softening point exceeding 75° C., measured according to the ring and ball method, to which the said polyethylene dispersion agent is added in the molten state.

Asphalt bitumens having a softening point lower than 60° C. measured according to the ring and ball methods are preferred as dispersion agents because of their comparatively low cost.

As a dispersion agent not only the aforesaid asphalt bitumens becoming liquid at a comparatively low temperature are suitable, since paraffin, paraffin oil, ozokerite, lignite wax, stearic acid, stearin pitch, carnauba wax and candlelilla wax may also be used.

It is pointed out that with the present invention such non-volatile dispersion agents are used in view of the comparatively high temperature at which the mixing operation takes place. Since, according to the invention, a dispersion agent is used with which the polyethylene can be mixed homogeneously at least in a ratio of one part by weight of polyethylene to two parts by weight of dispersion agent, it can be ensured that the desired mixture of polyethylene and asphalt bitumens contains only a very small percentage of the dispersion agent, so that it has little influence on the properties of this mixture.

*Example I*

Equal quantities by weight of polyethylene and asphalt bitumens are mixed by adding, whilst stirring, polyethylene having an average molecular weight of 19,000, as calculated from the viscosity of the molten polyethylene at 190° C. to asphalt bitumen heated to 150° C. and having a ring and ball softening point of 45° C. The mixture is ready in a few minutes and one part by weight is mixed, whilst stirring, with 100 parts by weight of asphalt bitumen heated to 200° C. and having a ring and ball softening point of approximately 135° C. and a penetration number of approximately 5 at 25° C., measured according to U. S. A. S. T. M. rule D 566–42 T. After 5 minutes a homogeneous dispersion is obtained. After cooling the mass of asphalt bitumen has a viscosity such that no cracks occur, and the softening point and the penetration number are not or substantially not altered; these values have become 140° C. and approximately 5 respectively at 25° C.

The mixing operation of the said kind of polyethylene in the form of powder with the asphalt bitumen having a high melting point in question without using a dispersion agent occupies at least one hour, and the dispersion obtained is less homogeneous. It is pointed out that the viscosity at different temperatures, for example between 200° C. and 250° C. does not materially exceed that of the said asphalt bitumen without polyethylene.

*Example II*

Equal quantities by weight of polyethylene and asphalt bitumen are mixed by adding, whilst stirring, polyethylene having a molecular weight of 10,000, to asphalt bitumen heated to 150° C. and having a ring and ball softening point of 45° C. The mixture is ready in a few minutes and one part by weight is mixed, whilst stirring, with 100 parts by weight of asphalt bitumen heated to 200° C. and having a ring and ball softening point of approximately 85° C. and a penetration number of approximately 7 at 25° C. Even after 5 minutes a homogeneous mixture is obtained. After cooling the mass of asphalt bitumen has a ring and ball softening point of approximately 90° C., the penetration number being unchanged.

The mixing of this powdered polyethylene with asphalt bitumen without using a dispersion agent occupies at least one hour.

*Example III*

Equal quantities by weight of polyethylene having an average molecular weight of 19,000 and paraffin having a dropping point of 55° C., measured according to U. S. A. S. T. M. rule D 5-25 T, are mixed by adding, whilst stirring, the polyethylene to the paraffin heated to 150° C. After 2 minutes the homogeneous mixture is ready and 1 part by weight is mixed, whilst stirring, with 10 parts by weight of asphalt bitumen heated to 200° C., the latter having a ring and ball softening point of 115° C. and a penetration number of approximately 10 at 25° C. After cooling a viscous mass having a ring and ball softening point of 120° C. and an unchanged penetration number is obtained.

*Example IV*

Two parts by weight of polyethylene having a molecular weight of 10,000 are added, whilst stirring at 150° C., to one part by weight of paraffin oil. The mixture is ready in a few minutes and one part by weight is mixed, whilst stirring, with 200 parts by weight of asphalt bitumen heated to 180° C. which has a ring and ball softening point of approximately 115° C. and a penetration number of approximately 10 at 25° C. After 5 minutes a homogeneous dispersion is obtained. After cooling a mass of asphalt bitumen is obtained having a ring and ball softening point of approximately 120° C., the penetration number being unchanged.

Without paraffin oil the mixing operation of this polyethylene in the asphalt bitumen occupies more than one hour and the dispersion is less homogeneous than that obtained according to the invention.

*Example V*

Equal quantities by weight of polyethylene and ozokerite are mixed by adding, whilst stirring, the polyethylene having an average molecular weight of 17,000 to the ozokerite heated to 120° C. and having a drop point of 85° C. After 2 minutes the homogeneous mixture is ready and 5 parts by weight are mixed, whilst stirring, with 100 parts by weight of asphalt bitumen heated to 200° C. and having a ring and ball softening point of approximately 135° C., and a penetration number of approximately 5 at 25° C. After 5 minutes a homogeneous solution is obtained. After cooling the mass of asphalt bitumen has such a viscosity that no cracks occur and the softening point and penetration number have not or substantially not changed; these values have become 140° C., and approximately 5 respectively at 25° C.

What we claim is:

A method of homogeneously mixing an asphalt bitumen having a softening point exceeding 75° C. as measured by the ring and ball method with polyethylene to reduce the brittleness of the asphalt bitumen which comprises the steps of mixing the polyethylene with an asphalt bitumen having a melting point below 60° C., as measured by the ring and ball method, melting the mixture of polyethylene and the asphalt bitumen of low melting point, and adding the mixture of polyethylene and asphalt bitumen of low melting point while in a molten state to the asphalt bitumen of higher melting point.

JAN CORNELIS DERKSEN.
FRANS MARIE JACOBS.

REFERENCES CITED

The following references are of record in the file of this patent:

UNITED STATES PATENTS

| Number | Name | Date |
|---|---|---|
| 2,339,958 | Sparks | Jan. 25, 1944 |
| 2,475,699 | Derksen | July 22, 1949 |